Feb. 27, 1951   R. L. DUCKLO   2,543,546
MACHINE FOR DECORATING PARTS
Filed Jan. 24, 1944

ROBERT L. DUCKLO,
INVENTOR.

BY Chas. E. Pindar
atty.

Patented Feb. 27, 1951

2,543,546

UNITED STATES PATENT OFFICE 2,543,546

MACHINE FOR DECORATING PARTS

Robert L. Ducklo, Cincinnati, Ohio, assignor to The Louis G. Freeman Company, Cincinnati, Ohio, a corporation of Ohio Application January 24, 1944, Serial No. 519,562

7 Claims. (Cl. 101—316)

My invention relates to machines used chiefly in the shoe industry but available in many other arts, whereby patterns of decorative holes, print markings or burned markings may be applied on a piece of work located in a gauged position with reference to the decorating instrumentality.

An example of a machine to which my invention may be applied is to be found in U. S. Letters Patent No. 2,241,398, to B. W. Freeman. In this machine a carriage is provided for the decorating instrumentality, or die, which carriage moves to and fro from a position of rest away from the operator, to a position for operation on the work toward the operator. Cooperating with this carriage is a work holder which moves toward the carriage in order to effect an operation on the work, and the work is gauged in position on the work holder.

In such a machine the work does not move except upwardly toward the carriage. My invention would also be operative in the case of a carriage which not only moved to and from a work engaging position, but was such that the die could then be forced down as by a press plunger engaging the support for the die when the carriage was forwardly arranged, said die support being slidable in the carriage normal to its movement.

While not limited thereto the gauging operation according to my present invention may be stated to be "shadow gauging." Thus preferably, I provide a source of illumination shaded from the operator which shines fairly directly down on a gauging plate having a properly shaped outline, thus projecting a shadow on the work, whereupon the work may be adjusted to line up portions thereof with the shadow outline. An operator can learn to gauge accurately without recourse to the shadow by taking an accustomed place in front of the machine and looking past the edge of the gauging means to the work. Thus it is not necessary for true shadow gauging to be employed.

With such an arrangement, however, the work can be quickly positioned without manipulating any gauge device such as a masking plate, or pushing the work about under a masking plate or against a gauging edge, etc., which is incident to all previous gauging operations with which I am familiar.

Where the work holder does not have any movement which would tend to dislodge the work from its adjusted position, there is no need of clamping the work in place. Also where the decorating instrumentality moves to and fro as in the machine above referred to, the shadow casting gauging plate may be mounted on the carriage along with the decorating instrumentality and will thus have definite relation to the position of the instrumentality, and will move forward beyond the work, when the carriage advances to work operating position, but will be located directly over the work when the carriage is at rest position. In the example of my invention shown, this is the arrangement adopted.

It will be understood that the illustrated and described embodiment is but one example of the application of my invention, and in the claims that follow and to which reference is hereby made, the inventive novelty will be set forth.

Figure 1:
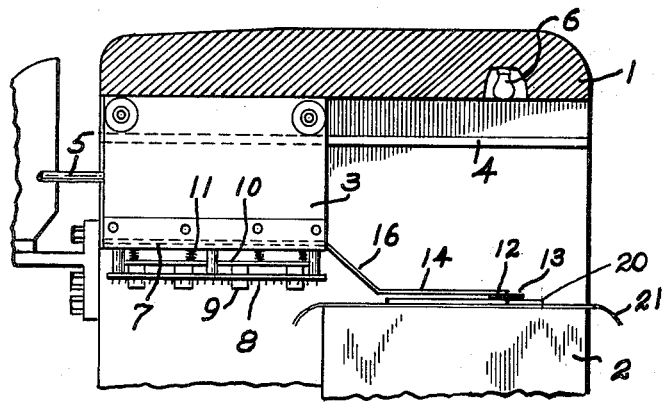
Figure 1 is a section taken through the frame of a cut-out machine showing the novel attachment according to my invention in side elevation. The parts are at rest positions.
Figure 2:
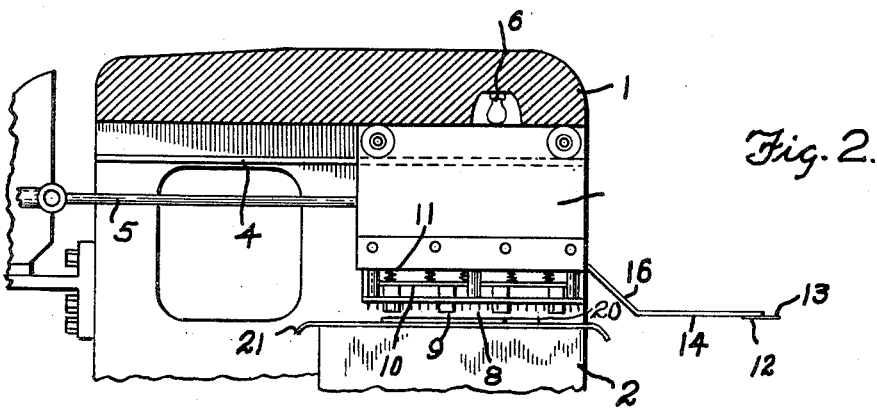
Figure 2 is a like view showing wherein the carriage has moved forward ready for a decorating operation.
Figure 3:
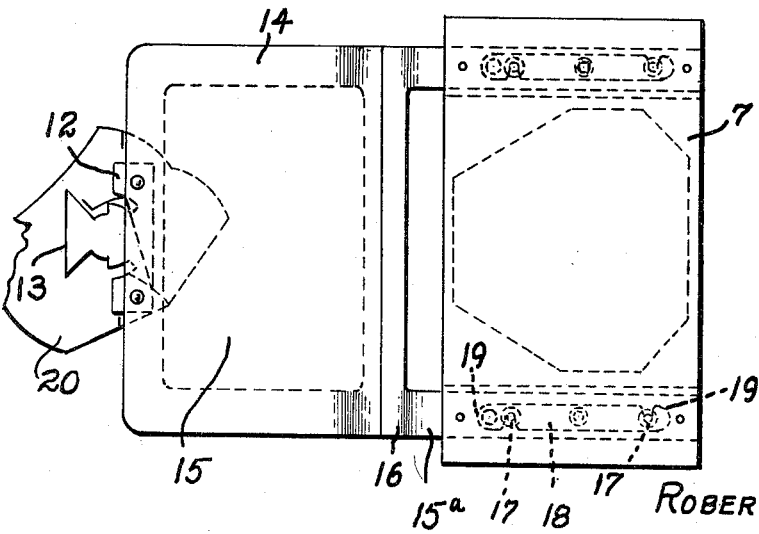
Figure 3 is a plan view of the attachment, taken from above.

The frame of the press, as in the Letters Patent hereinabove referred to, is indicated at 1, and the movable work supporting bed at 2. The carriage 3 is shown as moving on tracks 4, energized by a machine operated pusher rod 5. Located in the press directly over the work supporting bed is a source of illumination in the form of a light bulb 6, which is shaded from the operator.

The die, as shown, is formed with a base 7, which is supported on the carriage, on which base will be located the decorating devices, in this instance a series of perforating tubes 8. A stripping device is preferably used with the present structure which assures that the work is stripped from the die and lies on the work supporting bed, before the carriage moves, following a decorating operation.

In Freeman et al. Patent No. 2,241,398 is shown a spring operated stripping member located in the press carriage, and such a structure is advantageously used in my present device. In the illustrated example, the strippers are in the form of a series of sliding bars 9 which pass through the perforating tube assembly. These bars are mounted on resiliently supported plates 10, which latter plates have their spring mounting posts 11 in contact position with the stripping mechanism device in the carriage, as will be understood from the said Freeman et al. patent. It is not necessary however, to provide for additional stripping, and dies which merely print with ink, or are of a type to be heated and print by heat marks, may be used, or combinations of these, more particularly dies wherein the stripper plates have print marking ridges thereon, and the perforating tubes or cut-out blades project through apertures in the plates, thus accomplishing both cutting and marking.

The gauging device consists of a gauging plate 12 which has its advanced edge cut specially as indicated at 13, with the shape which will match with portions of the work being treated. The plate 12 is shown as secured fixedly to a frame 14, which in this instance is rectangular, and is covered by means of a plate 15. The side arms of the frame 14 are extended at 15a, and bent as indicated at 16, for purposes of attachment to the under side of the base plate 7 of the die.

To that end the extended portions 16 have holes therein which fit over fixed studs 17 on the under side of the base plate of the die, the arms each having a centrally pivoted latch bar 18 that has oppositely slotted ends 19 which engage around the stud ends when the latch is rotated to position parallel to the arms.

Thus arranged, the gauging plate lies at a lower level than the base of the carriage, being preferably slightly below the position of the decorating instrumentality or die. When the carriage is in rearmost or idle position, the gauging frame lies over the work support, and the work pieces 20 may be adjusted until the selected boundaries or marks on the work will match up with the shape of the gauging edge. With the use of the light bulb a shadow of the gauging edge will be projected toward the work support, and the work can readily be slid under the projecting top plate of the gauge frame, to a location to gauge its position with reference to the shadow.

Then when the press is operated the carriage moves forward toward the work, thus moving the entire frame forwardly of the front edge of the work support. The work simply lies on the work support where it was located, since there is nothing to disturb it. Then the work support rises to bring the work and the die together resulting in decorating the work. The work is stripped as the work support lowers, carrying the work with it, and the carriage is then free to retract to its original position, with the gauging plate clearing the work.

With such an arrangement no special gauging device need be provided on the work support, and the usual backing paper (indicated at 21) may be caused to pass over the work support without any special arrangements for a gauging and clamping unit which has to be cleared thereby.

The gauging is very rapid consisting usually of simply sliding the work forward under the protecting plate until it encounters the shadow line, or the work can be viewed from above the gauging edge of the gauge plate. The gauge element comes as part of the die but is mounted directly on the die, and could, if desired for any machine, be secured fast to the base plate of the die.

It is apparent that the described structure insofar as concerns shadow gauging alone, is not a limiting factor at all, but that with the general type of arrangement now described the gauging without any contact of the work, and even without any clamping of the work in any way is of great advantage from the more limited point of view. The gauging frame may indeed be permanent and the gauging plate itself be arranged as an attachment to go with each die.

Having thus described my invention, what I claim as new and desire to secure by Letters Patent is:

1. In a machine for decorating parts which includes a carriage movable to and from a work decorating position, a work support which is overhung by the carriage when in its work decorating position, and a decorating die mounted on the carriage, a gauge device secured in fixed relation to the decorating die, on the said carriage, said gauging device including a shaped edge which, when the carriage is in its position away from above the work support, overlies and is spaced above the proper location on the work support for like shaped portions of the work.

2. In a machine for decorating parts which includes a carriage movable to and from a work decorating position, a work support which is overhung by the carriage when in its work decorating position, and a decorating die mounted on the carriage, a gauge device secured in fixed relation to the decorating die, on the said carriage, said gauging device including a shaped edge which, when the carriage is in its position away from above the work support, overlies and is spaced above the proper location on the work support for like shaped portions of the work, the said shaped edge of the gauging device being located at a level below the normal level of the carriage so as to come closer to the work.

3. In a machine for decorating parts which include a carriage movable to and from a work decorating position, a work support which is overhung by the carriage when in its work decorating position, and a decorating die mounted on the carriage, a gauge device secured in fixed relation to the decorating die, on the said carriage, said gauging device including a shaped edge which, when the carriage is in its position away from above the work support, overlies and is spaced above the proper location on the work support for like shaped portions of the work, the said shaped edge of the gauging device being located at a level below the normal level of the carriage so as to come closer to the work, said gauge device being mounted on bent arms to provide this feature.

4. In a machine for decorating parts which includes a carriage movable to and from a work decorating position, a work support which is overhung by the carriage when in its work decorating position, and a decorating die mounted on the carriage, a gauge device secured in fixed relation to the decorating die, on the said carriage, said gauging device including a shaped edge which, when the carriage is in its position away from above the work support, overlies and is spaced above the proper location on the work support for like shaped portions of the work, and a source of artificial illumination so located with respect to the work support as to cast the shadow of the shaped edge in the proper position for work gauging of a piece of work on the work support.

5. In a machine for decorating parts which includes a carriage movable to and from a work decorating position, a work support which is overhung by the carriage when in its work decorating position, and a decorating die mounted on the carriage, a gauge device comprising a covered frame having at its forward edge a specially shaped portion to overlie the work when on the work support, when the carriage is away from work decorating position, said frame having arms which mount it upon the carriage, and said arms being bent so that the level of the decorating edge is below the level of the carriage and above the level of the work support.

6. In a decorating machine having a framework, a die carrying carriage on said framework, a work support on said framework, a die mounted on said carriage, means for moving said die carriage and said work support relative to each other into and out of decorative engagement, a movable gauging device on said framework, movable into and out of two positions whereby in one position the gauging device overlies the work support in offset relation thereto so as to gauge work thereon by casting a shadow of the gauging device over the work area, and in its second position lying in out of the way non-gauging position, means responsive to the movement of the die carriage and the work support relative to each other in each decorating operation to move said gauging device from its first position into its second position and return.

7. In a decorating machine which includes a framework, a work-supporting element, a die-carrying element, a die mounted on said die-carrying element, means for moving said die-carrying element and said work-supporting element relative to each other into and out of decorating engagement, a gauging device, and means including said framework for mounting said gauging device for movement into either of two positions whereby in one position the gauging device overlies the work-supporting element in offset relationship thereto so as to gauge work thereon by casting a shadow of the gauging device over the work area, and in its second position lying in out of the way non-gauging position, and said last mentioned means being responsive to the movement of the die-carrying element and the work-supporting element relative to each other in each decorating operation to move the gauging device from its first position into its second position and return.

ROBERT L. DUCKLO.

REFERENCES CITED

The following references are of record in the file of this patent:

UNITED STATES PATENTS

| Number | Name | Date |
| --- | --- | --- |
| 1,388,110 | Hallock | Aug. 16, 1921 |
| 2,013,679 | Altvater | Sept. 10, 1935 |
| 2,140,697 | Freeman | Dec. 20, 1938 |
| 2,143,504 | Altvater | Jan. 10, 1939 |
| 2,307,820 | Butters | Jan. 12, 1943 |
| 2,357,045 | Hauer | Aug. 29, 1944 |